(12) United States Patent
Jiang et al.

(10) Patent No.: US 11,652,547 B2
(45) Date of Patent: May 16, 2023

(54) METHOD AND SYSTEMS TO IDENTIFY TYPES OF FIBERS IN AN OPTICAL NETWORK

(71) Applicant: HUAWEI TECHNOLOGIES CO., LTD., Shenzhen (CN)

(72) Inventors: Zhiping Jiang, Kanata (CA); Simin Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/484,668

(22) Filed: Sep. 24, 2021

(65) Prior Publication Data

US 2023/0101519 A1   Mar. 30, 2023

(51) Int. Cl.
H04B 10/079 (2013.01)
H04J 14/02 (2006.01)

(52) U.S. Cl.
CPC ...... *H04B 10/07953* (2013.01); *H04J 14/021* (2013.01)

(58) Field of Classification Search
None
See application file for complete search history.

(56) References Cited

U.S. PATENT DOCUMENTS

| | | |
|---|---|---|
| 5,619,321 A | 4/1997 | Massimo et al. |
| 6,765,659 B1 | 7/2004 | Bhatnagar et al. |
| 7,796,270 B2 | 9/2010 | Yelin et al. |
| 8,422,888 B2 | 4/2013 | Uekama |
| 10,211,920 B1 | 2/2019 | Khaleghi et al. |
| 10,411,796 B1 | 9/2019 | Archambault et al. |
| 10,554,299 B2 | 2/2020 | Jiang et al. |
| 10,659,153 B2 | 5/2020 | Zhong et al. |
| 2003/0071985 A1 | 4/2003 | Mori et al. |
| 2003/0180051 A1 | 9/2003 | Veith et al. |
| 2004/0208523 A1 | 10/2004 | Carrick et al. |
| 2005/0110981 A1 | 5/2005 | Hayashi |

(Continued)

FOREIGN PATENT DOCUMENTS

| | | |
|---|---|---|
| CN | 1447554 A | 10/2003 |
| CN | 101819086 A | 9/2010 |

(Continued)

OTHER PUBLICATIONS

E. Seve, C. Delezoide, J. Pesic, S. Bigo and Y. Pointurier, "Automated Fiber Type Identification," 2018 European Conference on Optical Communication (ECOC), 2018, pp. 1-3.

(Continued)

*Primary Examiner* — Darren E Wolf

(57) ABSTRACT

A method to determine the types of optical fibers forming a link of an optical communication network. By scanning a signal's bit error rate at a receiver end, as a function of a pre-dispersion applied to a signal at a transmitter end, local minimums in the curve indicate the presence of amplifiers, and therefore fiber span extremities. By determining the accumulated dispersion at each fiber extremity, a ratio of dispersion per span length can be obtained and the span's coefficient of chromatic dispersion be inferred, thereby identifying the type of fiber. Alternatively, a signal's signal-to-noise ratio can be scanned, instead of its bit error rate. In a typical network, the required instrumentation is pre-existing.

16 Claims, 12 Drawing Sheets

(56) References Cited

U.S. PATENT DOCUMENTS

| | | |
|---|---|---|
| 2005/0244164 A1 | 11/2005 | Miyashita et al. |
| 2008/0175590 A1 | 7/2008 | Perkins et al. |
| 2008/0187323 A1 | 8/2008 | Hona et al. |
| 2009/0196615 A1 | 8/2009 | Kauffman et al. |
| 2009/0238563 A1 | 9/2009 | Fakashiro et al. |
| 2009/0238578 A1* | 9/2009 | Taylor ............... H04B 10/6972 398/147 |
| 2009/0269058 A1 | 10/2009 | Summa et al. |
| 2009/0279890 A1 | 11/2009 | Duan et al. |
| 2009/0297154 A1 | 12/2009 | Isumi |
| 2010/0021179 A1* | 1/2010 | Kikuchi ............... H04B 10/61 398/208 |
| 2010/0097601 A1 | 4/2010 | Bato et al. |
| 2010/0284701 A1 | 11/2010 | Lin et al. |
| 2011/0200339 A1* | 8/2011 | Komaki ............... H04B 10/65 398/208 |
| 2012/0170928 A1 | 7/2012 | Tanaka et al. |
| 2013/0202291 A1 | 8/2013 | Cavaliere et al. |
| 2013/0229662 A1 | 9/2013 | Ogawa |
| 2015/0188285 A1* | 7/2015 | McClean ............... G01M 11/33 356/73.1 |
| 2015/0318921 A1 | 11/2015 | Zhao et al. |
| 2016/0164599 A1 | 6/2016 | Heismann |
| 2016/0204876 A1 | 7/2016 | Kamura et al. |
| 2018/0013490 A1* | 1/2018 | Searcy ............... G01M 11/30 |
| 2018/0359027 A1 | 12/2018 | Brzozowski et al. |
| 2019/0349092 A1* | 11/2019 | Qiao ............... H04B 10/6161 |

FOREIGN PATENT DOCUMENTS

| | | |
|---|---|---|
| CN | 103267743 A | 8/2013 |
| CN | 103957050 A | 7/2014 |
| CN | 105099544 A | 11/2015 |
| CN | 205538163 U | 8/2016 |
| JP | H08285729 A | 11/1996 |

OTHER PUBLICATIONS

E. Seve et al., "Automated Fiber Type Identification in SDN-Enabled Optical Networks," in Journal of Lightwave Technology, vol. 37, No. 7, pp. 1724-1731, Apr. 1, 2019.
ISA/CN, International Search Report and Written Opinion for PCT/CN2018/084726 dated Jun. 15, 2018 (10 pages).
Kevin Miller, M2Optics, Inc., Chromatic Dispersion in Optical Fibers, Aug. 24, 2011, 7 pages.
Wikipedia, Amplified spontaneous emission last modified Dec. 16, 2020, 2 pages.
Wikipedia, Cross-Correlation last modified Sep. 9, 2022.
Wikipedia, Precision Time Protocol, last modified Jun. 5, 2022, 10 pages.
ITU-T G.652, Series G: Transmission Systems and Media, Digital Systems and Networks Transmission media and optical systems characteristics—Optical fibre cables, Characteristics of a single-mode optical fibre and cable, Nov. 2016, 28 pages.
ITU-T G.653, Series G: Transmission Systems and Media, Digital Systems and Networks Transmission media and optical systems characteristics—Optical fibre cables, Characteristics of a dispersion-shifted, single-mode optical fibre and cable, Jul. 2010, 22 pages.
ITU-T G.654, Series G: Transmission Systems and Media, Digital Systems and Networks Transmission media and optical systems characteristics—Optical fibre cables, Characteristics of a cut-off shifted single-mode optical fibre and cable, Mar. 2020, 24 pages.
ITU-T G.655, Series G: Transmission Systems and Media, Digital Systems and Networks Transmission media and optical systems characteristics—Optical fibre cables, Characteristics of a non-zero dispersion-shifted single-mode optical fibre and cable, Nov. 2009, 26 pages.

* cited by examiner

METHOD AND SYSTEMS TO IDENTIFY TYPES OF FIBERS IN AN OPTICAL NETWORK

CROSS-REFERENCE TO RELATED APPLICATIONS

This is the first application filed for the present invention.

TECHNICAL FIELD OF THE INVENTION

This invention pertains generally to the field of optical communications and in particular, to systems and methods for identifying types of optical fibers in an optical network.

BACKGROUND

When optimizing a design or certain operations in optical fiber communications, the types of fibers involved are essential parameters to have. For example, knowledge of the fiber type is necessary for evaluating nonlinear interference in the fiber, and for setting the adequate pump power in a distributed Raman amplifier.

Operators typically provide fiber types to system vendors at the earliest stage of system design. Owing to outdated records or erroneous fiber connections, it can happen that an operator uses inaccurate fiber types, particularly when buying or renting a part of the network infrastructure from another operator. This situation occurs increasingly often, as non-telecom companies (e.g., stadium operators) build their own infrastructures.

One solution of the prior art for online fiber type identification, is an online fiber type detection scheme based on its coefficient of chromatic dispersion (i.e. dispersion coefficient, or "D" in mathematical modelling), however, a drawback is the requirement of additional hardware.

Another solution of the prior art for identifying fiber types in a network is a scheme that uses the total light path dispersion as reported by a coherent transceiver. It is algorithm-based and leverages existing hardware, without requiring any additional hardware. However, it does not always work and is not reliable.

Therefore, there is a need for methods and systems to provide reliable, low cost solutions for identifying types of fibers in a network, without requiring additional hardware, and such would obviate or mitigate one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Embodiments of the present invention include methods and systems to identify types of fibers in an optical network. A link between a transmitter and a receiver can contain one or more spans of different optical fibers, separated by amplifiers. By applying a range of different pre-dispersions (preCD) to a signal, the signal's bit error rate at a receiving end can be measured as a function of the applied preCD. The scan obtained includes local minimums which can be mapped to the physical location of amplifiers marking the extremities of optical fiber spans. The difference in accumulated dispersions (CD) at two extremities of a span can be used with the corresponding length of the span, to obtain a coefficient of dispersion (D) which is typically unique to a common type of fiber.

Embodiments allow the identification of one or more fiber types in a link of an optical network, and can be implemented either with hardware that is pre-existing in the network, or with additional hardware. Hardware for implementing methods according to embodiments includes a transmitter operative to apply preCD to a signal, and a receiver operative to measure the bit error rate, as well as alternative. Processing data results according to embodiments can be performed with additional hardware, or alternatively with software implemented on a network's pre-existing hardware Embodiments allow identification of fiber types in an optical network, without having to resort to, in many cases, additional specialized equipment. By making it easier to identify the types of fibers a network, quality control is also made easier, for example by facilitating the evaluation of fiber and signal properties such as nonlinear interference. Knowledge of fiber type is also required for the installation of new equipment such as a distributed Raman amplifier, which requires a pump power that can be limited by a related fiber type.

Embodiments include a method of determining optical fiber type comprising: receiving an optical signal transmitted along a fiber with an initial pre-dispersion value; receiving additional optical signals transmitted along the fiber incrementing pre-dispersion values; measuring a parameter of each optical signal as a function of the pre-dispersion value applied; determining span dispersion from spacing between valleys of the measured parameter; and determining the fiber type using the span dispersion and the span length.

In embodiments, obtaining the span length (L) can comprise using optical time domain reflectometry.

In embodiments, determining a fiber type using a span dispersion and a span length can comprise: dividing span dispersion by span length, and identifying a type of fiber associated with the result.

In embodiments, some of the additional optical signals can have different central wavelengths.

In embodiments, a method can further comprise determining a fiber type using an average of multiple determinations of the span dispersion.

In embodiments, the parameter of a signal passing in the link can be the signal's bit error rate (BER).

In embodiments, the parameter of a signal passing in the link can be the signal's signal-to-noise ratio (SNR).

In embodiments, the parameter of a signal passing in the link can be the signal's self-phase modulation (SPM).

Embodiments include a system for determining optical fiber type comprising: a transmitter operative to apply a pre-dispersion (preCD) to an optical signal transmitted in the fiber; a receiver operative to measure a parameter of the optical signal; a processor operative to control the transmitter and increment the preCD, receive from the receiver the measured parameter of the optical signal as the preCD is incremented, determine span dispersion from spacing between valleys of the measured parameter; and determine the fiber type using the span dispersion and the span length.

In embodiments, a system can further comprise an optical time domain reflectometer operative to determine the span length.

Embodiments include a processor operative to determine a fiber type using the span dispersion and the span length, by dividing span dispersion by span length, and identifying a type of fiber associated with the result.

In embodiments, a processor can be further operative to determine the fiber type using an average of multiple determinations of the span dispersion.

In some embodiments, a processor can perform multiple determinations of a span dispersion at different central wavelengths.

Embodiments include a system operative to measure and process a parameter of a signal, wherein the parameter of the signal is the signal's bit error rate (BER).

Embodiments include a system operative to measure and process a parameter of a signal, wherein the parameter of the signal is the signal's signal-to-noise ratio (SNR).

Embodiments include a system operative to measure and process a parameter of a signal, wherein the parameter of the signal is the signal's self-phase modulation (SPM).

BRIEF DESCRIPTION OF THE DRAWINGS

It will be noted that throughout the appended drawings, like features are identified by like reference numerals.

DETAILED DESCRIPTION

In an optical network, different portions can make use of different types of fibers, depending on their function. Of the many parameters characterizing an optical fiber, one of the most important is the coefficient of chromatic dispersion D, typically expressed in units of ps/nm of wavelength, per km of propagation, i.e. (ps/nm)/km. It is also referred to as the coefficient of dispersion or dispersion coefficient.

As examples, two of the most widely used optical fibers are the Standard Single Mode Fiber (SSMF) and the Large Effective Area Fiber LEAF®, respectively standardized by the International Telecommunication Union (ITU) Telecommunication Standardization Sector (ITU-T) as SSMF G.652 and LEAF G.655. The dispersion coefficient of a SSMF is approximately 16-18 (ps/nm)/km, and that of a LEAF is approximately 3-5 (ps/nm)/km. By determining a fiber's dispersion coefficient, the fiber type can be inferred. Embodiments include methods and systems for determining an optical fiber's coefficient of chromatic dispersion D.

In a coherent optical performance monitoring network, both SSMF s and LEAFs can be included and often, either one can be installed between reconfigurable optical add/drop multiplexers (ROADM).

Figure 1:
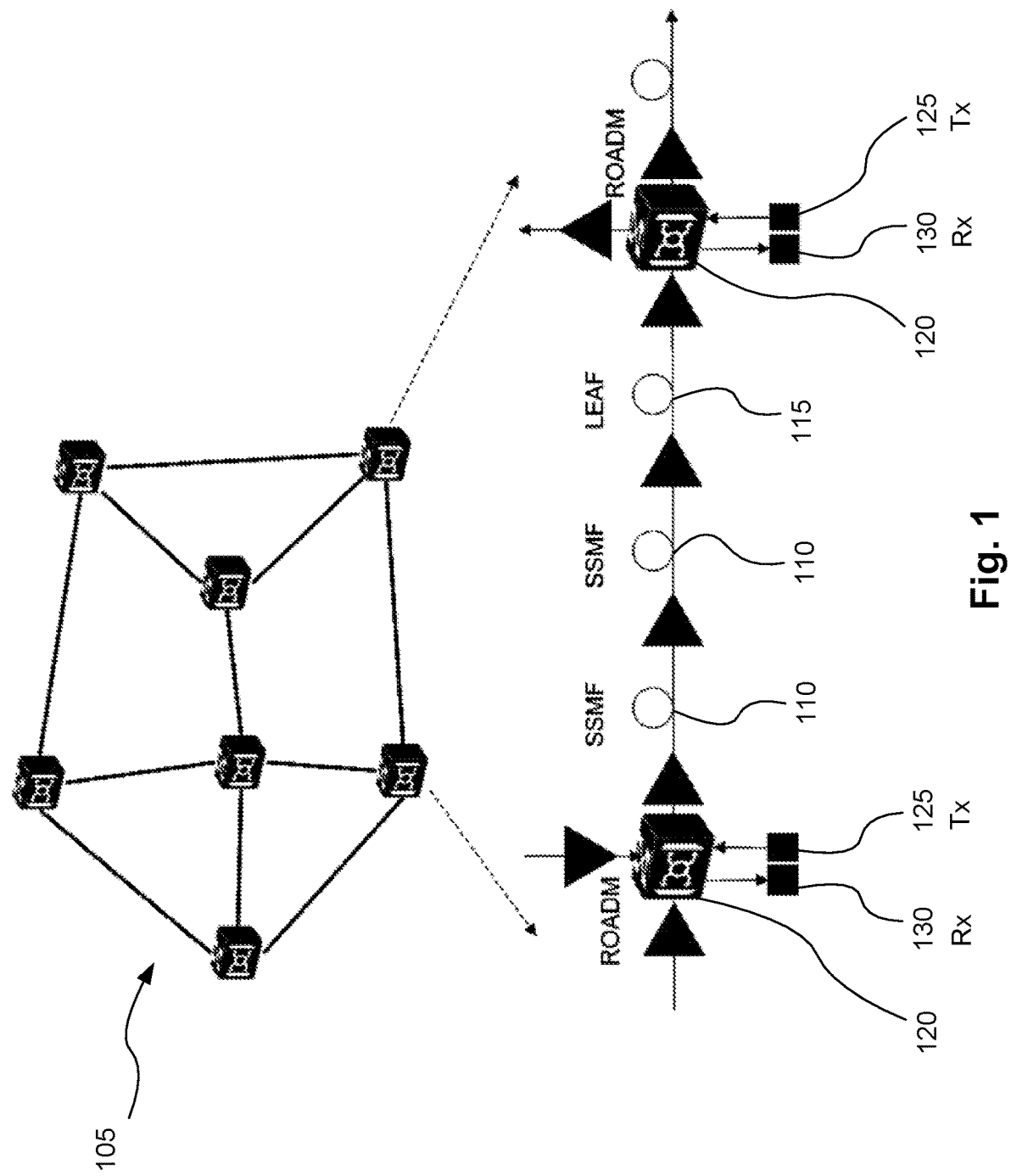
FIG. 1 illustrates an optical network in which various fiber types are used for different portions of the network, in accordance with embodiments.

FIG. 1 illustrates an optical network 105 in which various types of fibers are used for different portions of the network. In particular, the bottom portion of the network includes a series of two SSMF s 110 and one LEAF 115. Together, they form a link between two ROADMs 120, in order to provide coherent optical performance monitoring (OPM). Each ROADM 120 can be connected to one or more transmitters (Tx) 125 and/or one or more receivers (Rx) 130.

In an optical network, a link between a transmitter and a receiver, can be represented as Tx→link→Rx, can include one or more spans. The dispersion coefficient D of a link can be determined and monitored, and embodiments allow the dispersion coefficient D of each span of the link to be determined and monitored as well. Typically, a channel can propagate a signal with quadrature amplitude modulation (i.e. a QAM signal), and a transmitter (Tx) 125 is equipped to pre-compensate for signal dispersion, i.e. to apply a pre-dispersion (preCD). A signal can be received by a coherent receiver (Rx) 130, which can also compensate for link dispersion, among other impairments. A receiver (Rx) 130 can also be configured to report the total dispersion from a transmitter to a receiver (Tx-Rx dispersion) as well as the bit error rate.

Figure 2:
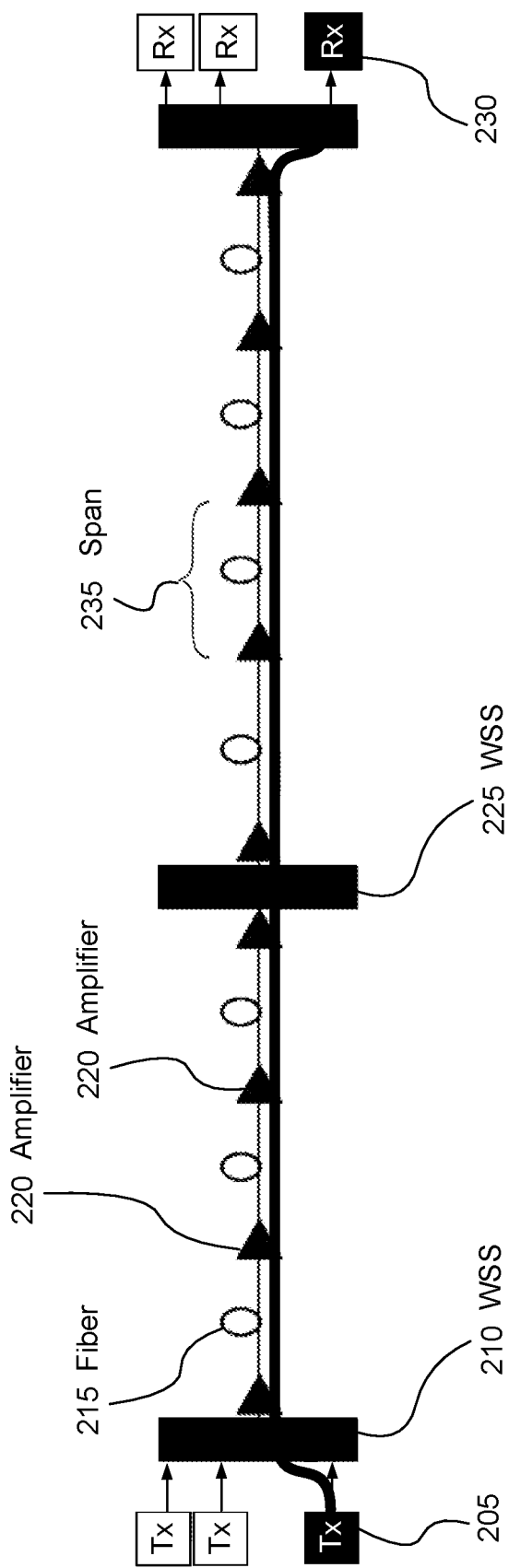
FIG. 2 illustrates a point-to-point optical network, in accordance with embodiments.

FIG. 2 illustrates a point-to-point optical network. One or more signals having different wavelengths can be sent from transmitters 205 to a wavelength selective switch (WSS) 210 (which can be part of a ROADM), propagated through a fiber 215, and maintained with a series of signal amplifiers 220 up to a second WSS 225. This can be repeated until a signal reaches a receiver 230. Each section between two amplifiers 220 can be referred to as a span 235. The dispersion coefficient D of a fiber can be determined by monitoring the signal in any one of its channels.

Embodiments include the measurement of a bit error rate (BER) of a signal at an Rx end, as a function of the preCD applied to the signal at a Tx end. The scan of BER as a function of preCD has local minimums troughs (i.e. valleys or troughs) which can be mapped to the locations of amplifiers 220 marking the extremities of optical fiber spans. When an applied preCD results in a minimal BER, the preCD corresponds to the accumulated dispersion (CD) at an extremity of an optical fiber span. The span's coefficient of dispersion D can be estimated by comparing the accumulated dispersion (CD) at one of its extremities, and the accumulated dispersion (CD) at its other extremity, i.e. at two neighboring local minimums. With span length information, which can be obtained for example with optical time domain reflectometry (OTDR), the span's coefficient of dispersion D can be obtained and the fiber type inferred.

Figure 3:
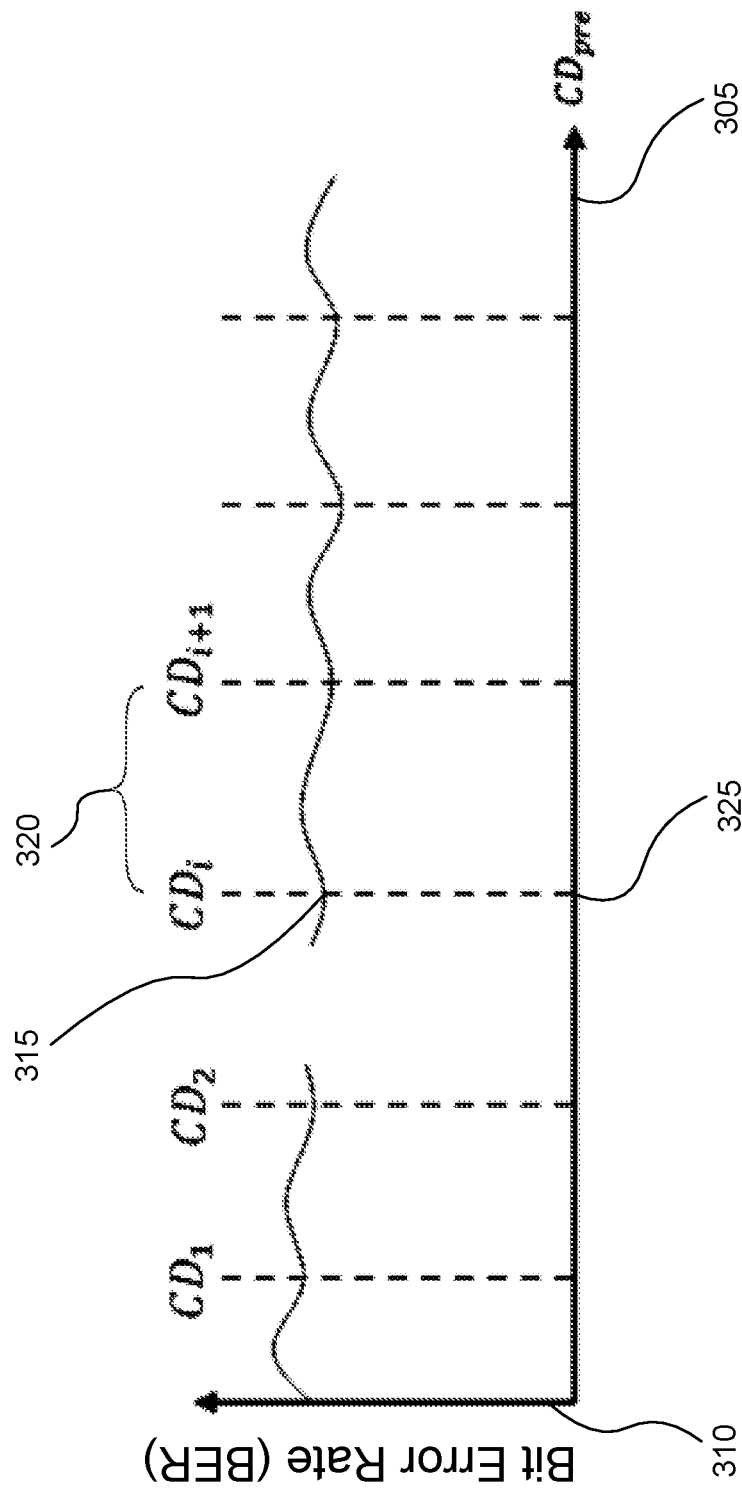
FIG. 3 is a graph showing the bit error rate (BER) of a signal as a function of a pre-dispersion (preCD) applied to the signal, in an optical fiber link with many spans, in accordance with embodiments.

FIG. 3 is a graph showing a periodic fluctuation in the bit error rate (BER) as a function of applied preCD (also denoted $CD_{pre}$ when used mathematically), in a span 235 of optical fiber, according to embodiments. In an optical fiber, the BER 310 can be a function of the applied preCD 305. Such a BER curve has a profile in which each local minimum corresponds to a point 325 where a signal is newly amplified by an amplifier 220 at the beginning of a span 235. The accumulated dispersion $CD_i$ (where $CD_i$ denotes the accumulated dispersion at the $i^{th}$ minimum of the curve) 315 at that point 325, corresponds to the end point of a span 235 along the fiber, i.e. the difference in two successive $CD_i$ 320 corresponds to a physical span 235 of fiber in which the two accumulated dispersions $CD_i$ occur.

To identify the type of fiber making up a span of a link between two amplifiers, a method according to embodiments can be described in a flowchart.

Figure 4:
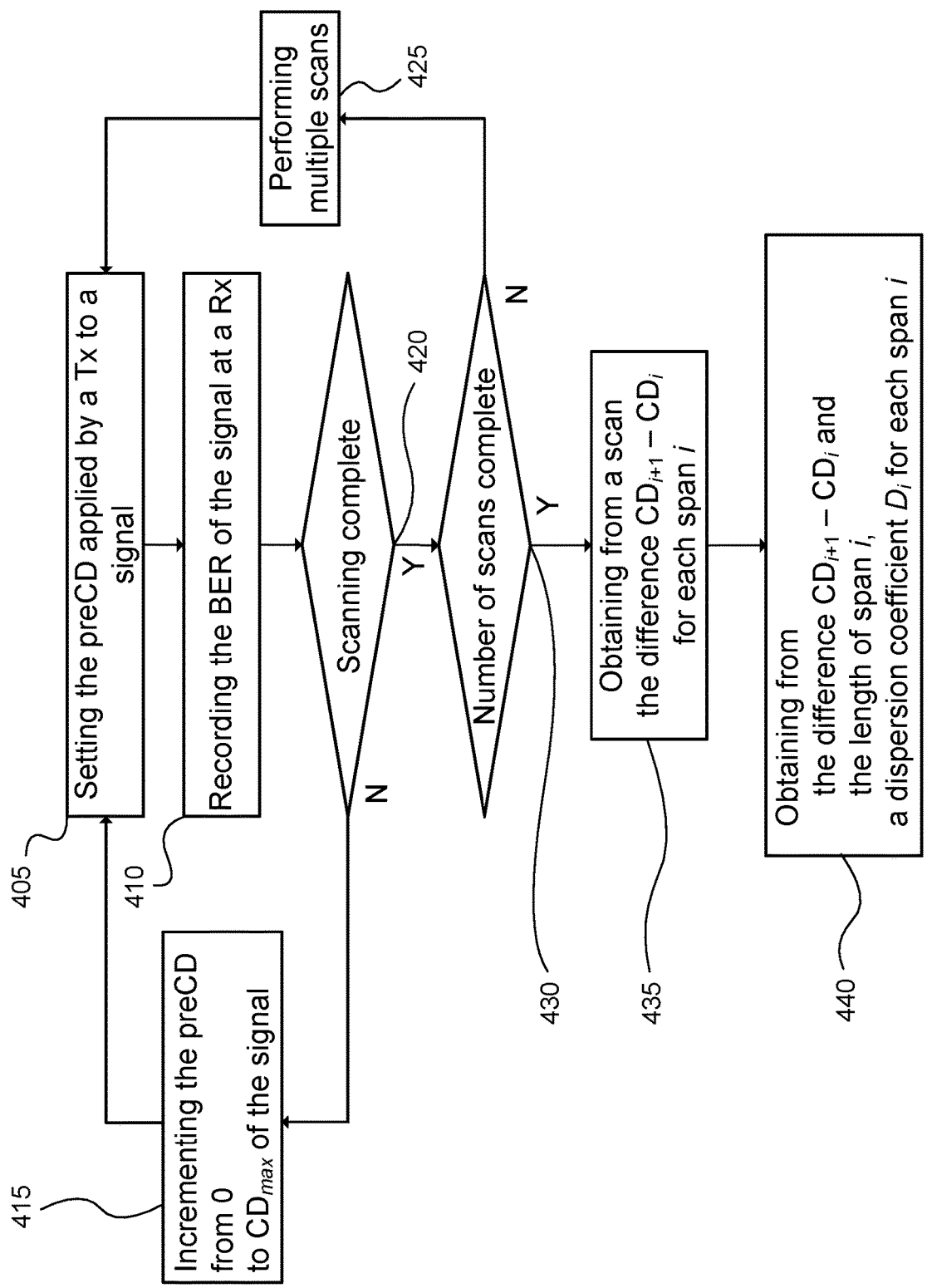
FIG. 4 is a flowchart illustrating a method by which the type of optical fiber forming a span of a link can be identified, according to embodiments

FIG. 4 is a flowchart illustrating a method by which the type of optical fiber forming a span can be identified, according to embodiments. With a link made from many spans bounded by amplifiers, the link being bounded by an appropriate Tx and an appropriate Rx, a user or processor can initially set 405 the pre-dispersion (preCD) applied to a signal via the Tx. Then, the user or processor can record 410 the bit error rate (BER) of the signal at the Rx end. In an embodiment, the user or processor can increment 415 the applied preCD from 0 up to the maximum dispersion ($CD_{max}$) a signal can accumulate in the link. A scan can be performed for any wavelength or channel running through a fiber and therefore, once a scanning is complete 420, multiple further scans can be performed 425 as well, in order to provide validation to the results, and to improve their quality and reliability.

Once a selected number of scans is complete 430, points of minimal BER can be identified. A user or processor can obtain from the points of minimal BER the accumulated dispersions $CD_i$ and $CD_{i+1}$, at two neighboring points of minimal BER, i.e. point i and point i+1, and use these values to obtain the difference $CD_{i+1}-CD_i$ 435. The difference $CD_{i+1}-CD_i$ corresponds to the accumulated dispersion in a span. By mapping a $CD_i$ with a span i, a user or processor can obtain 440, from the difference $CD_{i+1}-CD_i$ and the length of span i, a dispersion coefficient $D_i$ for each span i of the link.

In an optical fiber, the nonlinear phenomenon of self-phase modulation (SPM) can be used to monitor the dispersion and determine a coefficient of dispersion D. SPM is one of the Kerr nonlinearities, where a signal's phase is modified by the signal's own power or intensity in a fiber. To consider SPM, a signal's complex electric field amplitude E(t) with SPM, can be expressed as:

$$E(t)=E_{no\ SPM}(t)\exp(j\phi_{SPM})$$

where:

$E_{no\ SPM}(t)$ is the electric field without considering SPM, and $\phi_{SPM}$ is the SPM's nonlinear phase:

$$\phi_{SPM}=\gamma\Delta z|E_{no\ SPM}(t)|^2$$

where:

γ is a fiber's nonlinear phase change per unit power and unit length (nonlinear coefficient), Δz is the length of the fiber segment being considered, and $|E(t)|^2 \equiv P(t)$ is the signal's power at time t.

In a fiber according to an embodiment, noise can mostly be due to phase variance, rather to a constant phase change. Therefore, nonlinear phase noise $noise_{NL}$ is typically proportional to the variance of the signal power:

$$noise_{NL} \propto var[P(t)] \quad (1)$$

In the case of a quadrature amplitude modulated (QAM) signal or a quadrature phase shift keying (QPSK) signal, the variance in power can depend on the pre-dispersion (preCD) applied to the signal.

Figure 5:
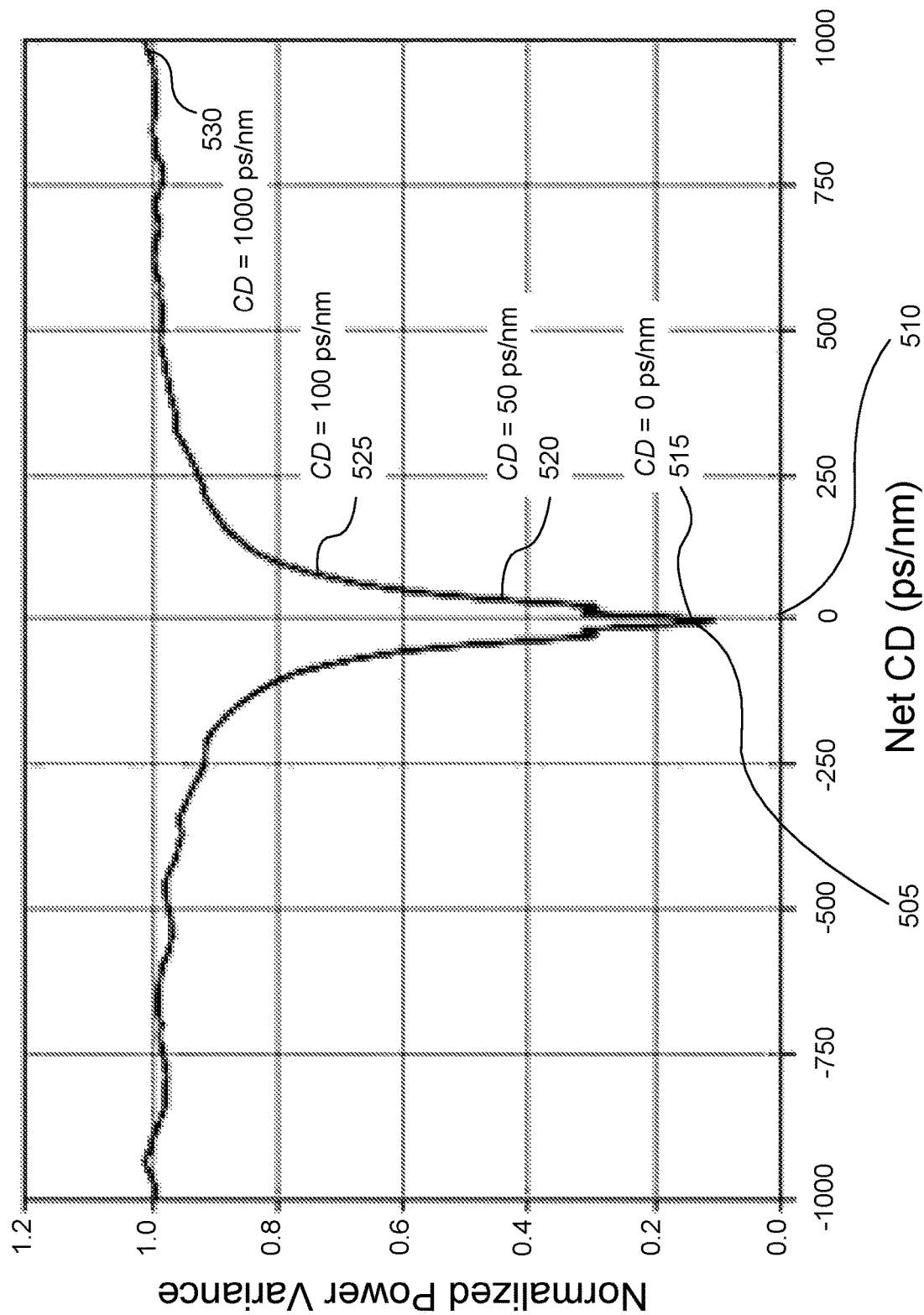
FIG. 5 illustrates the power variance of a 68 GBd signal with quadrature phase shift keying (QPSK), as a function of a preCD applied to the signal, in accordance with embodiments.

FIG. 5 is a graph of the power variance var[P(t)] in a 68 GBd QPSK signal, as a function of the net CD applied to the signal, according to an embodiment. The net dispersion (i.e. net CD) can be defined as the applied preCD plus the accumulated dispersion CD in a link. The graph shows a minimum 505 when the net CD is 0 ps/nm 510. From equation (1), a minimum in power variance var[P(t)] implies a minimum in nonlinear phase noise $noise_{NL}$. Therefore, it can be anticipated that the nonlinear phase noise $noise_{NL}$ is also minimal when net CD is 0 ps/nm.

To explain why a signal's power variance can have a minimum when net CD is 0 ps/nm, a constellation diagram can be illustrated for different levels of net CD. A constellation diagram is an xy-plane scatter diagram on a complex plane, where each point represents parameters of a signal at a sampling instant. A signal's amplitude is represented as the distance of a point from the graph's origin (radius), and the signal's phase is represented as the angular position of a point, as measured counterclockwise from the horizontal axis.

In a constellation diagram, the possible values for a signal's phase and amplitude (and therefore power) appear as a multitude of points. FIGS. 6a to 6d show that despite an increasing accumulated dispersion CD, the amplitude of a signal saturates, i.e. despite a ten-fold increase in points from a CD of 100 ps/nm to a CD of 1000 ps/nm, FIG. 6c and FIG. 6d look similar.

Figure 6B:
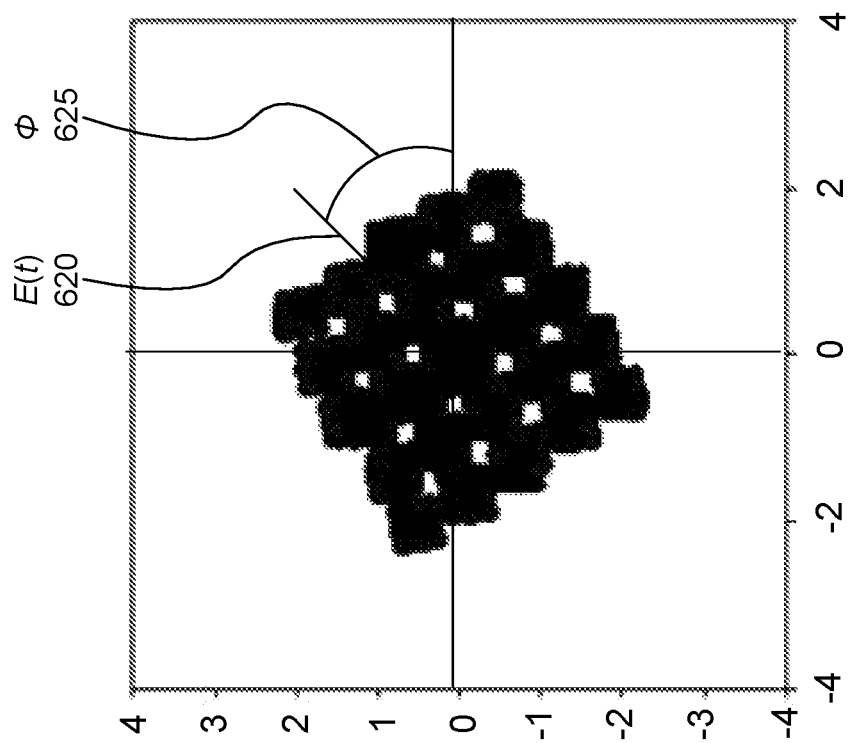
FIG. 6b is a constellation diagram for a 68 GBd QPSK signal having a preCD of 50 ps/nm, in accordance with embodiments.
Figure 6A:
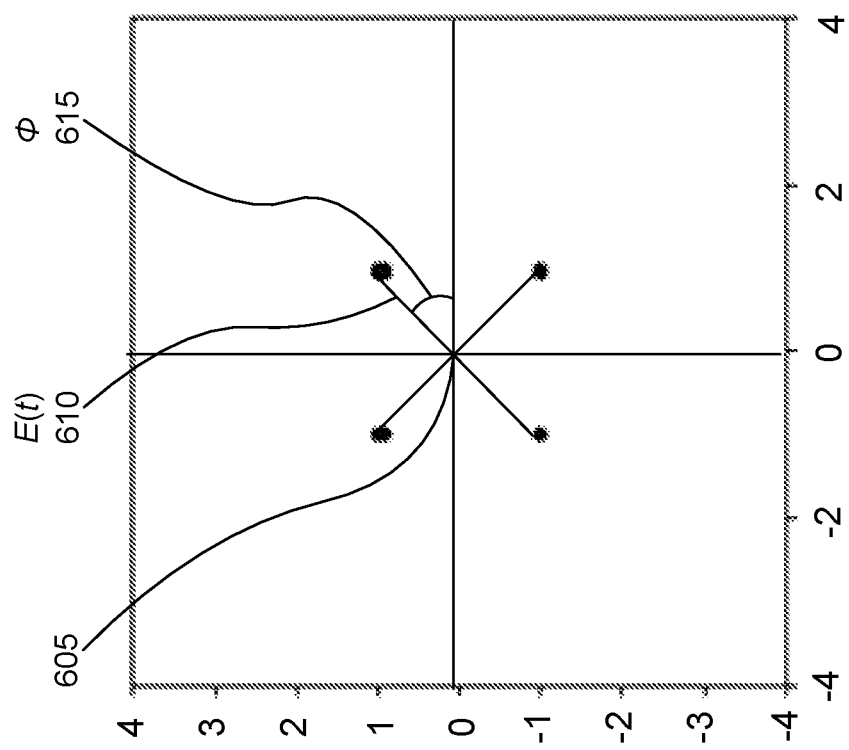
FIG. 6a is a constellation diagram for a 68 GBd QPSK signal having a preCD of 0 ps/nm, in accordance with embodiments.

FIG. 6a is a constellation diagram for a 68 GBd QPSK signal having an applied net CD of 0 ps/nm. A signal can have one electric field amplitude E(t), represented by the distance from the origin 605 to its representative point 610, and four different phases ϕ 615, as represented by four positions around the origin, each having a different angle from the horizontal axis. In this case, the amplitude E(t) 610 is the same regardless of the phase ϕ 615.

FIG. 6b is a constellation diagram for a 68 GBd QPSK signal having an applied net CD of 50 ps/nm. The variance in amplitude and in phase are greater that in the case of a 0 ps/nm preCD, as shown by the larger number of points, at many different distances 620 from the origin, and at many different counterclockwise angles 625 from the horizontal axis.

Figure 6D:
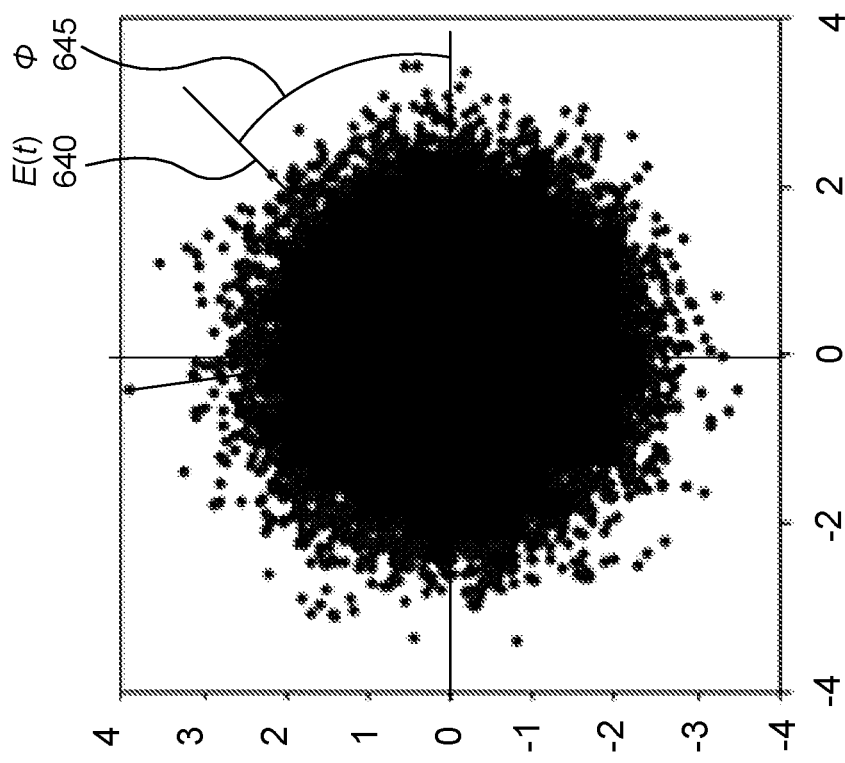
FIG. 6d is a constellation diagram for a 68 GBd QPSK signal having a preCD of 1000 ps/nm, in accordance with embodiments.
Figure 6C:
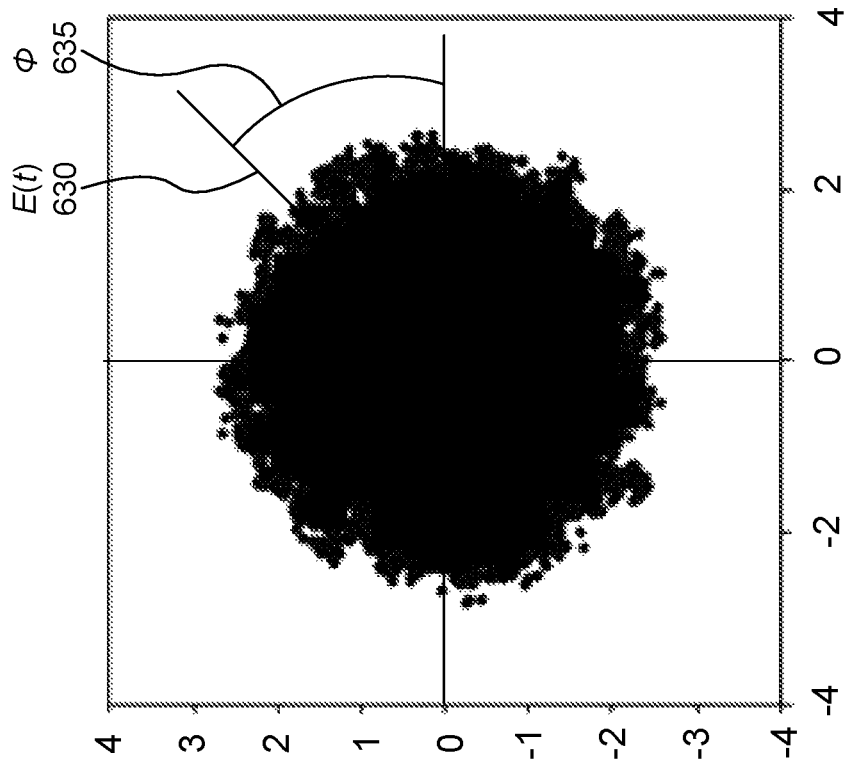
FIG. 6c is a constellation diagram for a 68 GBd QPSK signal having a preCD of 100 ps/nm, in accordance with embodiments.

FIG. 6c is a constellation diagram of a 68 GBd QPSK signal having an applied net CD of 100 ps/nm. The variances in amplitude 630 and phase 635 are greater that in the case of a 50 ps/nm pre-dispersion (FIG. 6b), and saturation can be noted as all phase angles are covered, and all amplitudes with the available phase angles are covered, up to a certain maximum, i.e. essentially no empty regions remains.

FIG. 6d is a constellation diagram of a 68 GBd QPSK signal having an applied net CD of 1000 ps/nm. The variances in amplitude 640 is somewhat greater that in the case of a 100 ps/nm pre-dispersion (FIG. 6c), but saturation can now be noted in that the number of new amplitude values is less than when increasing net CD from 100 ps/nm to 1000 ps/nm would suggest if the relation was linear. The possible values for phase angles 645 are already saturated.

Along a fiber link, noise from SPM can accumulate, such that the total SPM noise $\rho_{SPM}$ measured at a receiving end of a fiber is approximately the sum of SPM noise from the link including all of its fiber spans:

$$\rho_{SPM} = \int_0^L P^2(z)\kappa(z)dz \qquad (2)$$

Where:
P(z) is the local signal power at a distance z from an origin,
L is the length of the link including all of its fiber spans,
$\kappa(z)$ is the power of SPM noise generated by a unit length of fiber, with unit signal power, having units of $$\frac{1}{W^2 km},$$

and
$\rho_{SPM}$ is the normalized SPM noise power, i.e. a noise-to-signal ratio.

In eq. (2), it is assumed that the SPM noise generated at different fiber locations are incoherent which, strictly speaking, is not accurate. A more accurate SPM noise accumulation can take SPM noise correlation into consideration. However, for the purposes of embodiments, the approximation herein is sufficient.

Eq. (2) is an integration over a distance L. In a link where dispersion is not compensated, there can be a one-to-one relationship between a position along the fiber and an accumulated dispersion (CD). Therefore Eq. (2) can also be expressed as:

$$\rho_{SPM}(CD_{pre}) = \int_0^{CD_L} P^2(CD)\kappa(CD_{pre} + CD)dCD \qquad (3)$$

where $CD_L$ is the maximum CD for an entire link. Coefficient $CD_{pre}$ is included in the argument of SPM nonlinear noise coefficient $\kappa$, in order for the applied pre-dispersion $CD_{pre}$ to be considered.

An accumulated dispersion CD(z) can be a function of distance z via:

$$CD(z) = \int_0^z D(z)dz \qquad (4)$$

where D(z) is the fiber's coefficient of dispersion at position z.

To explain the minimums in the bit error rate (BER) vs. $CD_{pre}$ curve of FIG. 3, a plot of a signal's power along an optical link with fiber spans of 80 km can be helpful.

Figure 7:
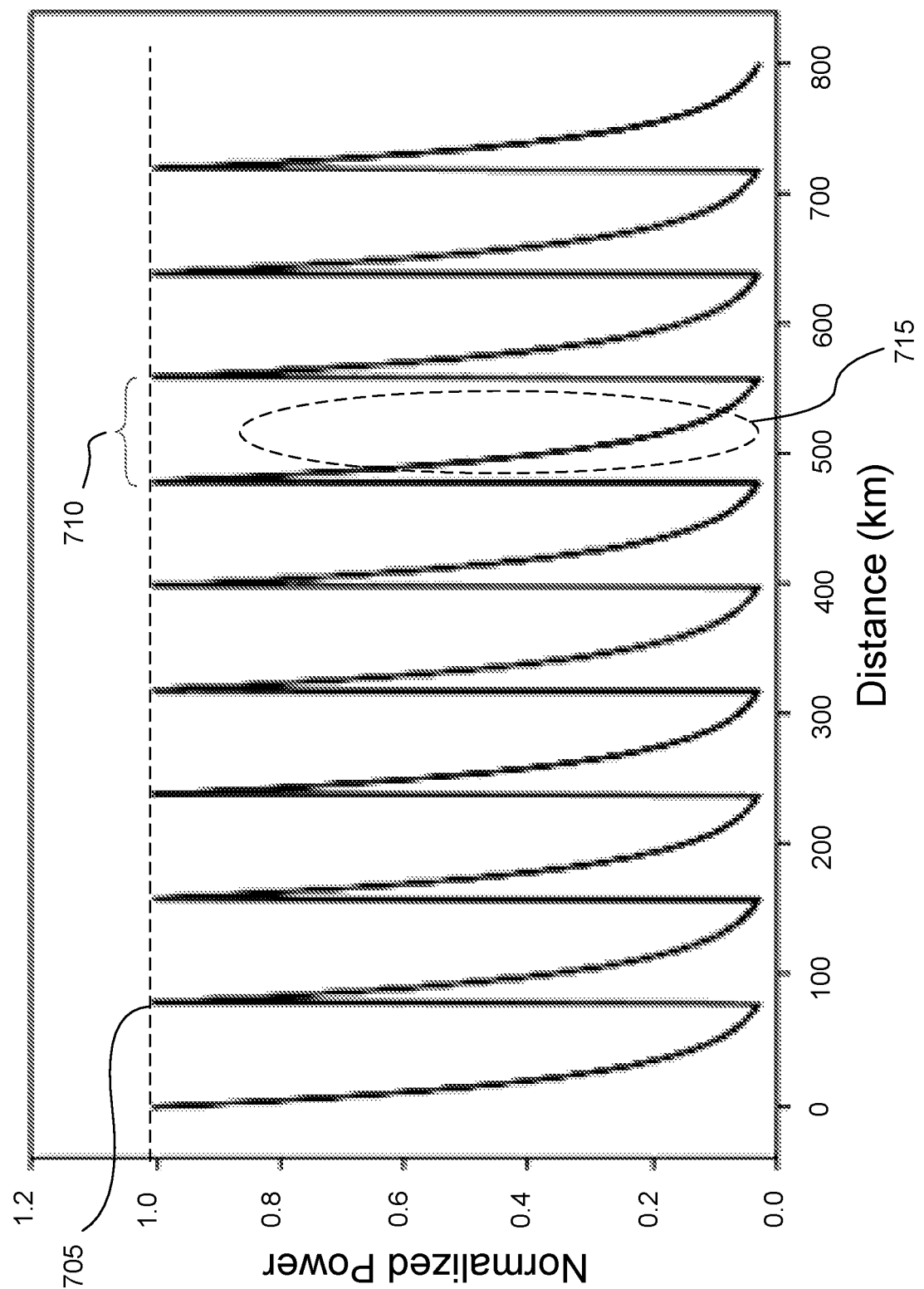
FIG. 7 is a graph showing the power of a signal along an optical link with optical fiber spans of 80 km, in accordance with a simulated embodiment.

FIG. 7 is a graph showing a signal's power along an optical link with a fiber span of 80 km, according to a simulated embodiment. The fiber's attenuation coefficient is 0.2 dB/km. The maximum signal power 705 is normalized to one, and at multiples of 80 km 710, corresponding to spans 235, there can be an optical amplifier 220 to compensate for loss 715 in the span.

To assess the SPM noise function $\rho_{SPM}(CD_{pre})$ of equation (3), a relative SPM contribution function $\kappa(CD_{pre}+CD)$ similar in shape to the curve in FIG. 5 can be used.

Figure 8:
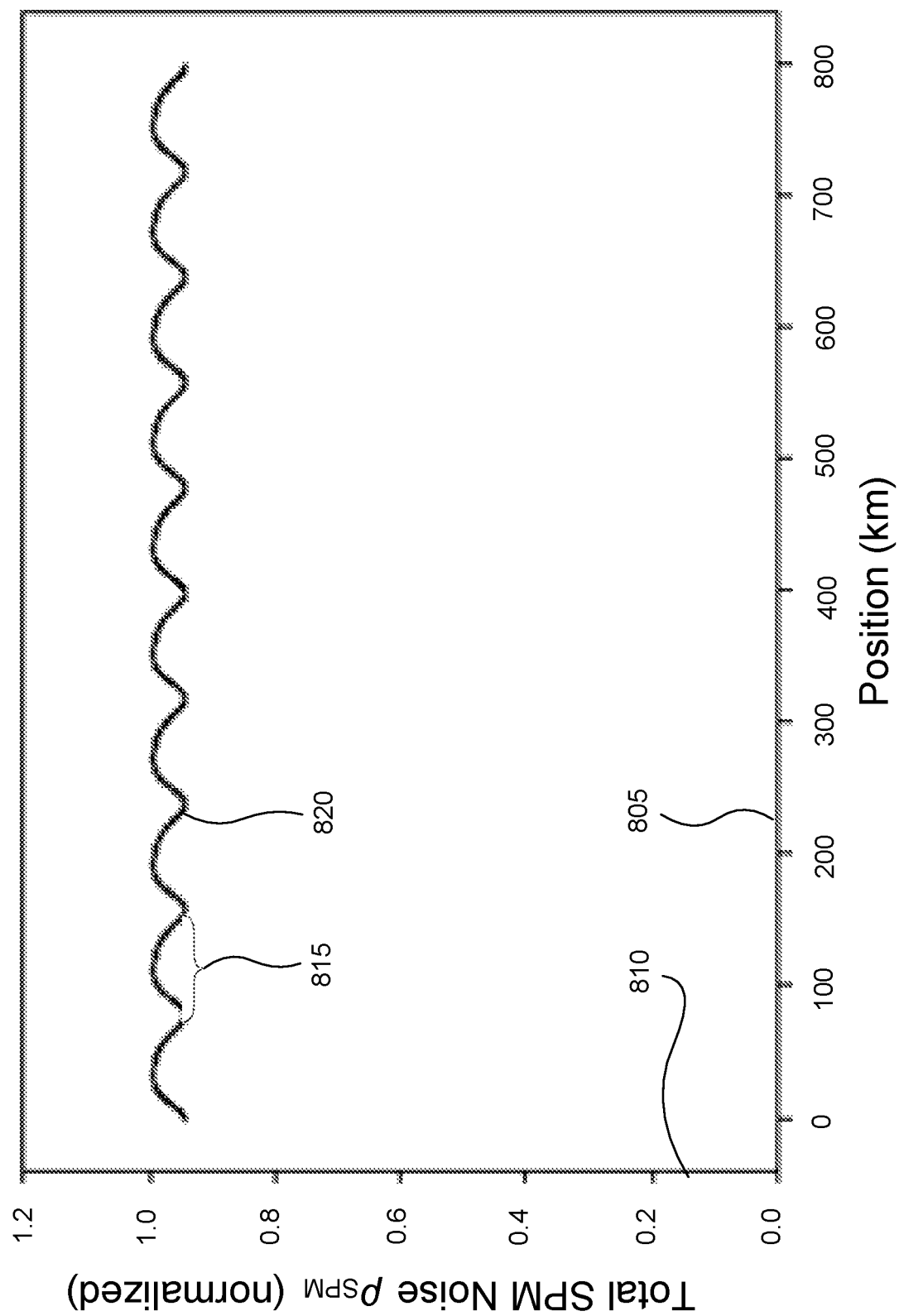
FIG. 8 is a normalized graph of noise due to self-phase modulation (SPM noise) along a fiber, of a 68 GBd QPSK signal, to which preCD is applied, in accordance with a simulated embodiment.

FIG. 8 is a graph representing the SPM noise $\rho_{SPM}(CD_{pre})$ along a fiber, of a 68 GBd QPSK signal to which pre-dispersion is applied, as calculated with equation (3), according to an embodiment. The curve is calculated with eq. (3) for $\rho_{SPM}(CD_{Pre})$, using a function $\kappa(CD_{pre}+CD)$ fitted to the curve in FIG. 5. The x-axis represents positions in km 805, along the fiber and the y-axis represents total normalized SPM noise 810. A curve of total normalized SPM noise, as a function of applied preCD would have a similar profile. A peak-and-valley behavior 815 can be seen, in which each local minimum (i.e. valley or trough) 820 corresponds to the beginning of a span 235, where the signal power is maximal. However, valleys of low SPM noise also correspond to where BER is minimal. It is therefore possible to use the BER to detect where a span begins.

In a fiber link, a bit error rate (BER) can be measured as a function of pre-dispersion preCD. The difference in applied preCD, between two adjacent valleys in a BER scan according to an embodiment, corresponds to the accumulated dispersion of a signal between the two extremities of a span. In other words, for a span i, the difference $(\Delta CD)_i = CD_{i+1} - CD_i$ is the accumulated dispersion in span i alone. For an 80 km span of SSMF, the accumulated dispersion in a span is about 1344 ps/nm, because:

$$(\Delta CD)_i = \text{Length of } span_i \times D \text{ of } SSMF$$

$$(\Delta CD)_i = 80 \text{ km} \times 16.8 \frac{\left(\frac{ps}{nm}\right)}{km}$$

$$(\Delta CD)_i = 1344 \frac{ps}{nm}$$

Figure 9:
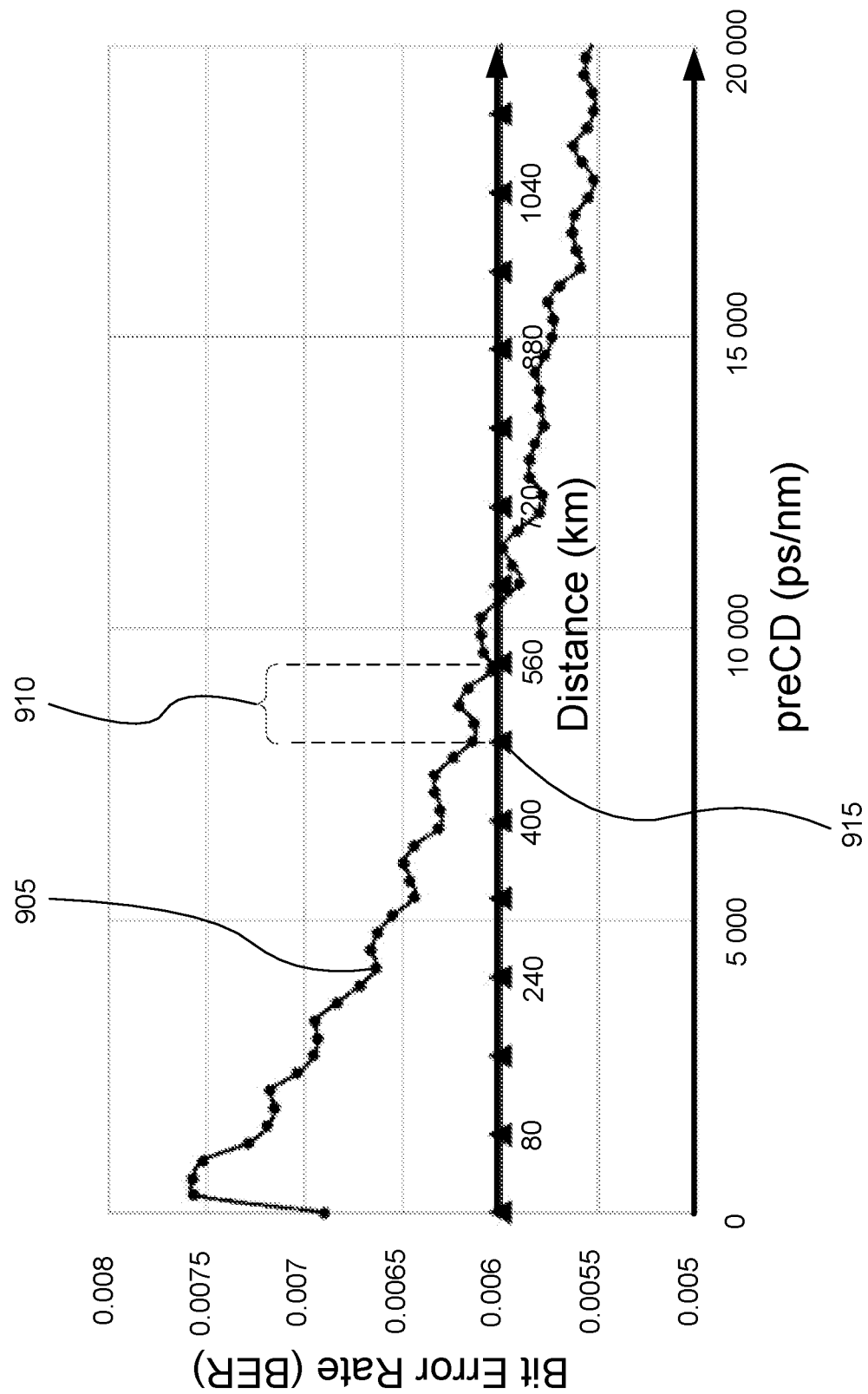
FIG. 9 is a graph showing the BER of a signal as a function of applied preCD, for a link made of a plurality of standard single mode fibers (SSMF), each one 80 km in length, according to a simulated embodiment.

FIG. 9 is a graph showing the BER of a signal as a function of applied preCD, for a link made of a plurality of standard single mode fibers (SSMF), each one 80 km in length, according to a simulated embodiment. Local minimums 905 in the BER can be seen, similarly to those 315 in FIG. 3. The local minimums in BER also corresponds to the local minimums in total SPM noise over distance 820 in FIG. 8. The locations where each span 910 begins is represented with a triangle 915 and their extremities correspond to BER local minimums 905.

Similarly, for a 75 km LEAF span, the accumulated dispersion $(\Delta CD)_i$ is about 300 ps/nm, because:

$$(\Delta CD)_i = \text{Length of } span_i \times D \text{ of LEAF}$$

$$(\Delta CD)_i = 75 \text{ km} \times 4 \frac{\left(\frac{ps}{nm}\right)}{km}$$

$$(\Delta CD)_i = 300 \frac{ps}{nm}$$

Figure 10:
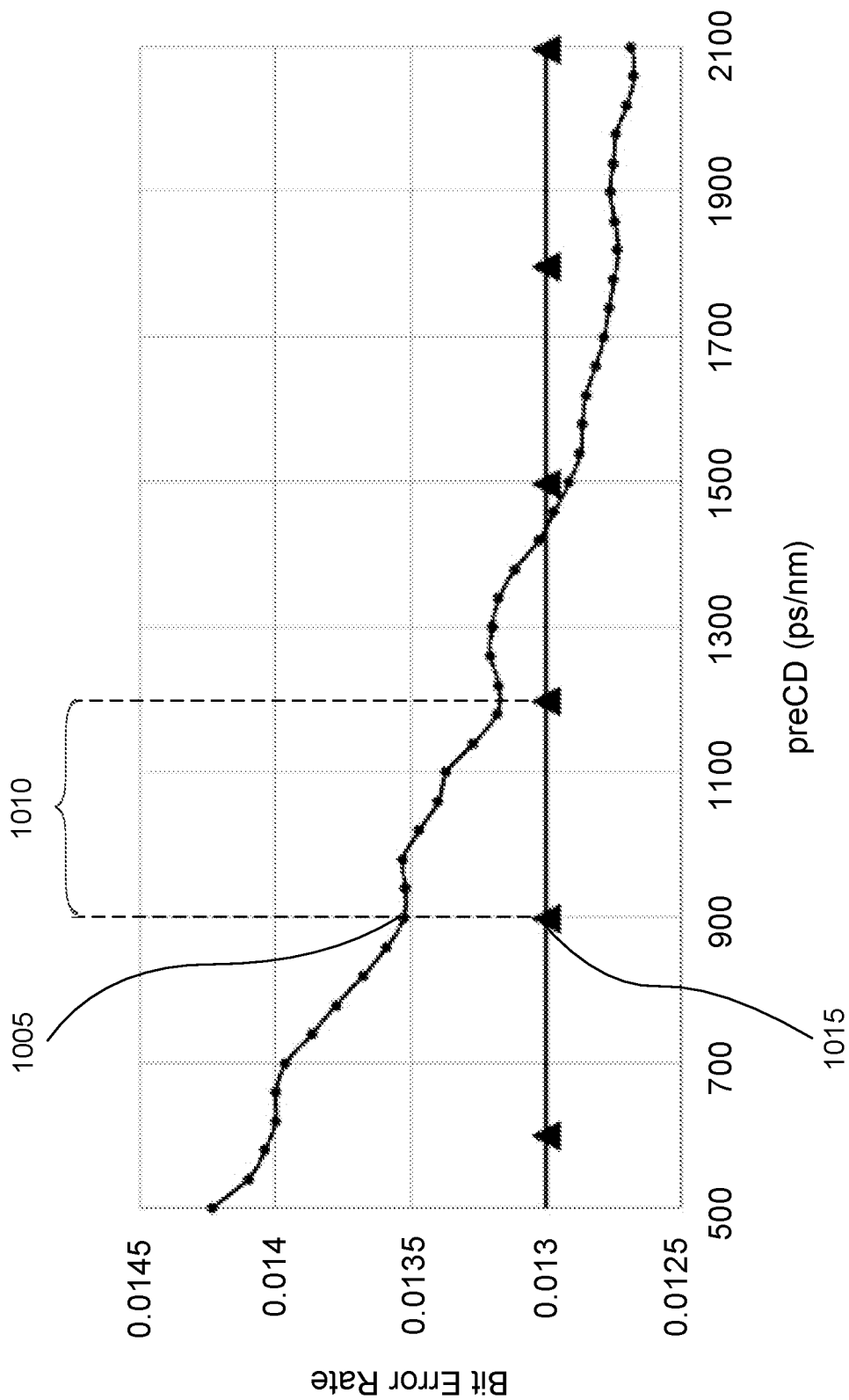
FIG. 10 is a graph showing the BER of a signal as a function of applied preCD, for a link made of a plurality of large effective area fiber (LEAF®), each one 75 km in length, according to a simulated embodiment.

FIG. 10 is a graph showing the BER of a signal as a function of applied preCD, for a link made of a plurality of large effective area fiber (LEAF®), each one 75 km in length, according to a simulated embodiment. Local minimums 1005 in the BER can be seen, similarly to those 315 in FIG. 3. The local minimums in BER are also similar to those 820 in total SPM noise over distance 820 in FIG. 8. The locations where each span 1010 begins is represented by a triangle 1015 and their extremities correspond to BER local minimums 1005.

The above values are in good agreement with actual span dispersions and show that a span's fiber type can be identified by calculating its coefficient of dispersion D using:

$$D = \frac{(\Delta CD)_i}{\text{Length of } span_i} \quad (5)$$

where $(\Delta CD)_i$ is obtained with a BER vs preCD scan of sufficient quality, and the length of span can be obtained with, for example, optical time domain reflectometry (OTDR).

Existing systems have natural BER fluctuations, and in an embodiment for a given system, it may be required to perform multiple scans of BER over preCD, and generate an average scan from which to extract accumulated dispersion values $CD_i$.

Furthermore, a fiber span may include many wavelengths, and in an embodiment, one, many, a range, or all wavelengths can be used to monitor fiber span dispersion and identify a fiber type. To get more accurate results, an embodiment can combine results from monitoring different wavelengths and produce an overall result.

In other embodiments, other parameters can be used instead of the BER. An embodiment can produce results from a signal-to-noise ratio SNR scan. Another embodiment can produce results from monitoring the compensated self-phase modulation (SPM) in the receiver.

Figure 11:
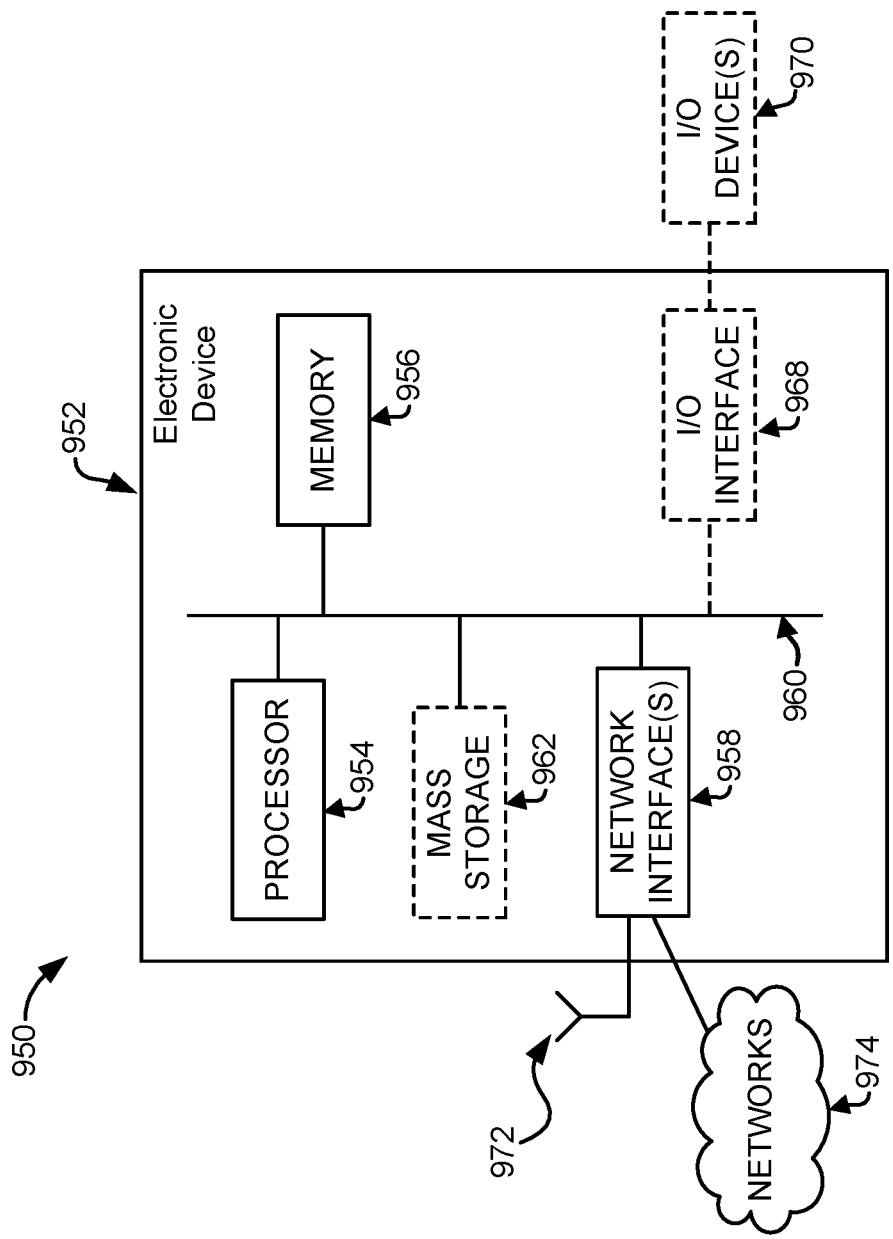
FIG. 11 is a block diagram of an electronic device, illustrated within a computing and communications environment that may be used for implementing the devices and methods according to embodiments.

FIG. 11 is a block diagram of an electronic device (ED) 952 illustrated within a computing and communications environment 950 that may be used for implementing the devices and methods disclosed herein. The electronic device 952 typically includes a processor 954, such as a central processing unit (CPU), and may further include specialized processors such as a field programmable gate array (FPGA) or other such processor, a memory 956, a network interface 958 and a bus 960 to connect the components of ED 952. ED 952 may optionally also include components such as a mass storage device 962, a video adapter 964, and an I/O interface 968 (shown in dashed lines). An ED 952 according to an embodiment can also include a cache.

The memory 956 may comprise any type of non-transitory system memory, readable by the processor 954, such as static random-access memory (SRAM), dynamic random-access memory (DRAM), synchronous DRAM (SDRAM), read-only memory (ROM), or a combination thereof. In an embodiment, the memory 956 may include more than one type of memory, such as ROM for use at boot-up, and DRAM for program and data storage for use while executing programs. The bus 960 may be one or more of any type of several bus architectures including a memory bus or memory controller, a peripheral bus, or a video bus.

The electronic device 952 may also include one or more network interfaces 958, which may include at least one of a wired network interface and a wireless network interface. A network interface 958 may include a wired network interface to connect to a network 974, and also may include a radio access network interface 972 for connecting to other devices over a radio link. The network interfaces 958 allow the electronic device 952 to communicate with remote entities such as those connected to network 974.

The mass storage 962 may comprise any type of non-transitory storage device configured to store data, programs, and other information and to make the data, programs, and other information accessible via the bus 960. The mass storage 962 may comprise, for example, one or more of a solid-state drive, hard disk drive, a magnetic disk drive, or an optical disk drive. In some embodiments, mass storage 962 may be remote to the electronic device 952 and accessible through use of a network interface such as interface 958. In the illustrated embodiment, mass storage 962 is distinct from memory 956 where it is included and may generally perform storage tasks compatible with higher latency, but may generally provide lesser or no volatility. In some embodiments, mass storage 962 may be integrated with a heterogeneous memory 956.

In some embodiments, electronic device 952 may be a standalone device, while in other embodiments electronic device 952 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

In embodiments, an electronic device 952 can be connected to any transmitter and receiver, for processing, storing and/or receiving signals and signal parameters. It can also be used for running a scan according to a program, by interfacing with a transmitter, applying preCDs of different values in sequence at the transmitter, receiving parameters from a receiver, and processing the parameters to obtain a bit error rate, a signal-to-noise ratio or other calculation results as may be necessary for an embodiment. It can also perform a series of scans, which may be similar and obtain an average scan based on the series of scan. It can also perform a series of scans, which may be different in some respect, such as regarding the observed wavelength, and obtain an average scan based on the series of scan. A memory 956 can be used for storing scanned data including independent variables of preCDs, and dependent variables of bit error rate, signal-to noise ratios, and results from processing such data. It can also be operative to interface with optical time domain reflectometry (OTDR), perform such measurements, and process results, in order to obtain the length of a span. It can also contain tables containing values for the lengths of spans and links of a network, as well as other fiber parameters such as dispersion coefficients and identifying names. It can also calculate, from scanned data, and table data, new values, match the new values to those of a table and produce corresponding table data as an output. A network interface 958 can be used at any transmitter, receiver, or node, to implement scanning, and for communicating results to a processor 954 operative to perform calculations required by embodiments. Inputs and outputs for calculations can be provided by, and to, a memory 956, network interfaces 974, and I/O interfaces 968.

Embodiments include a method of determining optical fiber type comprising: receiving an optical signal transmitted along a fiber with an initial pre-dispersion value; receiving additional optical signals transmitted along the fiber incrementing pre-dispersion values; measuring a parameter of each optical signal as a function of the pre-dispersion value applied; determining span dispersion from spacing between valleys of the measured parameter; and determining the fiber type using the span dispersion and the span length.

In embodiments, obtaining the span length (L) can comprise using optical time domain reflectometry.

In embodiments, determining a fiber type using a span dispersion and a span length can comprise: dividing span dispersion by span length, and identifying a type of fiber associated with the result.

In embodiments, some of the additional optical signals can have different central wavelengths.

In embodiments, a method can further comprise determining a fiber type using an average of multiple determinations of the span dispersion.

In embodiments, the parameter of a signal passing in the link can be the signal's bit error rate (BER).

In embodiments, the parameter of a signal passing in the link can be the signal's signal-to-noise ratio (SNR).

In embodiments, the parameter of a signal passing in the link can be the signal's self-phase modulation (SPM).

Embodiments include a system for determining optical fiber type comprising: a transmitter operative to apply a pre-dispersion (preCD) to an optical signal transmitted in the fiber; a receiver operative to measure a parameter of the optical signal; a processor operative to control the transmitter and increment the preCD, receive from the receiver the measured parameter of the optical signal as the preCD is incremented, determine span dispersion from spacing between valleys of the measured parameter; and determine the fiber type using the span dispersion and the span length.

In embodiments, a system can further comprise an optical time domain reflectometer operative to determine the span length.

Embodiments include a processor operative to determine a fiber type using the span dispersion and the span length, by dividing span dispersion by span length, and identifying a type of fiber associated with the result.

In embodiments, a processor can be further operative to determine the fiber type using an average of multiple determinations of the span dispersion.

In some embodiments, a processor can perform multiple determinations of a span dispersion at different central wavelengths.

Embodiments include a system operative to measure and process a parameter of a signal, wherein the parameter of the signal is the signal's bit error rate (BER).

Embodiments include a system operative to measure and process a parameter of a signal, wherein the parameter of the signal is the signal's signal-to-noise ratio (SNR).

Embodiments include a system operative to measure and process a parameter of a signal, wherein the parameter of the signal is the signal's self-phase modulation (SPM).

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method of determining an optical fiber type of a span of optical fiber having a length, comprising:
    receiving, from an optical fiber link comprising the span of optical fiber, a plurality of optical signals each having a respective, different pre-dispersion value;
    measuring a parameter of each of the plurality of optical signals to obtain a value of the parameter for each of the respective, different pre-dispersion values, the respective, different pre-dispersion values and the values of the parameter for each of the respective, different pre-dispersion value forming a data set;
    determining, according to the data set, a dispersion of the span of optical fiber from a difference between a first pre-dispersion value at a first local minimum of the measured parameter and a second pre-dispersion value at a second local minimum of the measured parameter, the first local minimum and the second local minimum being adjacent to each other; and
    determining the optical fiber type using the dispersion of the span of optical fiber and the length of the span of optical fiber.

2. The method of claim 1, further comprising obtaining the length of the span of optical fiber using optical time domain reflectometry.

3. The method of claim 1, wherein determining the optical fiber type using the dispersion of the span of optical fiber and the length of the span of optical fiber comprises:
    dividing the dispersion of the span of optical fiber by the length of the span of optical fiber to obtain a result, and
    identifying the optical fiber type in accordance with the result.

4. The method of claim 1, wherein some optical signals of the plurality of optical signals have different central wavelengths.

5. The method of claim 1, further comprising determining the optical fiber type using an average of multiple determinations of the dispersion of the span of optical fiber.

6. The method of claim 1, wherein the parameter is a bit error rate parameter.

7. The method of claim 1, wherein the parameter is a signal-to-noise ratio parameter.

8. The method of claim 1, wherein the parameter is a self-phase modulation parameter.

9. A system for determining an optical fiber type of a span of optical fiber having a length, comprising:
    a transmitter operative to apply a pre-dispersion to an optical signal and to transmit the optical signal in an optical fiber link comprising the span of optical fiber;

a receiver operative to receive the optical signal from the optical fiber link and to measure a value of a parameter of the optical signal; and a processor operative to:

control the transmitter to transmit a plurality of optical signals each having a respective, different pre-compensation value, receive from the receiver the value of the parameter for each of the plurality of optical signals having a respective, different pre-dispersion value, the respective, different pre-dispersion values and the values of the parameter for each of the respective, different pre-dispersion value forming a data set, determine, according to the data set, a dispersion of the span of optical fiber from a difference between a first pre-dispersion value at a first local minimum of the measured parameter and a second pre-dispersion value at a second local minimum of the measured parameter, the first local minimum and the second local minimum being adjacent to each other; and determine the optical fiber type using the dispersion of the span of optical fiber and the length of the span of optical fiber.

10. The system of claim 9, further comprising an optical time domain reflectometer operative to determine the length of the span of optical fiber.

11. The system of claim 9, wherein determining the optical fiber type using the dispersion of the span of optical fiber and the length of the span of optical fiber comprises:

dividing the dispersion of the span of optical fiber by the length of the span of optical fiber to obtain a result, and identifying the optical fiber type in accordance with the result.

12. The system of claim 9, wherein the processor is further operative to determine the optical fiber type using an average of multiple determinations of the dispersion of the span of optical fiber.

13. The system of claim 12, wherein the multiple determinations of the dispersion of the span of optical fiber are performed at different central wavelengths.

14. The system of claim 9, wherein the parameter is a bit error rate parameter.

15. The system of claim 9, wherein the parameter is a signal-to-noise ratio parameter.

16. The method of claim 9, wherein the parameter is a self-phase modulation parameter.

* * * * *